(12) United States Patent
Okello

(10) Patent No.: US 8,706,787 B2
(45) Date of Patent: Apr. 22, 2014

(54) CORDIC-BASED FFT AND IFFT APPARATUS AND METHOD

(75) Inventor: James Awuor Oduor Okello, Tokyo (JP)

(73) Assignee: NEC Corporation, Tokyo (JP)

( * ) Notice: Subject to any disclaimer, the term of this patent is extended or adjusted under 35 U.S.C. 154(b) by 1060 days.

(21) Appl. No.: 12/676,675

(22) PCT Filed: Sep. 26, 2007

(86) PCT No.: PCT/JP2007/069328
§ 371 (c)(1),
(2), (4) Date: Mar. 5, 2010

(87) PCT Pub. No.: WO2009/040957
PCT Pub. Date: Apr. 2, 2009

(65) Prior Publication Data
US 2010/0223312 A1  Sep. 2, 2010

(51) Int. Cl.
*G06F 17/14* (2006.01)
*G06F 7/38* (2006.01)
*G06F 7/32* (2006.01)
*G06F 7/52* (2006.01)

(52) U.S. Cl.
USPC ........... 708/404; 708/400; 708/408; 708/440; 708/511; 708/522; 708/622

(58) Field of Classification Search
USPC ................. 708/404, 408, 440, 522, 622
See application file for complete search history.

(56) References Cited

U.S. PATENT DOCUMENTS

| | | | |
|---|---|---|---|
| 4,896,287 A * | 1/1990 | O'Donnell et al. | 708/622 |
| 4,972,361 A * | 11/1990 | Rader | 708/522 |
| 5,233,551 A * | 8/1993 | White | 708/408 |
| 7,047,269 B2 * | 5/2006 | Wu et al. | 708/440 |
| 7,082,451 B2 * | 7/2006 | Kulkarni et al. | 708/404 |
| 2009/0240917 A1 * | 9/2009 | Fitton | 712/36 |
| 2010/0138631 A1 * | 6/2010 | Gangalakurti et al. | 712/7 |

OTHER PUBLICATIONS

Benjamin Heyne and Jurgen Gotze, "A Pure CORDIC Based FFT for Reconfigurable Digital Signal Processing." Proceedings of the XII, European Signal Processing Conference (EUSIPCO 2004), pp. 1513-1516. Sep. 6-10, 2004.*

International Search Report for PCT/JP2007/069328, mailed May 15, 2009.

J. Proakis et al., "Introduction to Digital Signal Processing", Maxwell Macmillan, 1989, pp. 698-699.

(Continued)

*Primary Examiner* — Farley Abad
*Assistant Examiner* — Henry Yu
(74) *Attorney, Agent, or Firm* — Sughrue Mion, PLLC

(57) ABSTRACT

Provided two CORDIC processors, each including: two input ports representing real and imaginary input ports; and two output ports representing real and imaginary output ports; wherein real and imaginary parts of a first input signal are applied to the imaginary input ports of the first and second CORDIC processors; real and imaginary parts of a second input signal are applied to the real input ports of the first and second CORDIC processors; the first and second CORDIC processors rotate the respective input signals applied thereto by 45 degrees in the clockwise direction; respective data from the real output ports of said first and second CORDIC processors constitute real and imaginary parts of a first output signal; and respective data from the imaginary output ports of said first and second CORDIC processors constitute real part and imaginary part of a second output signal.

20 Claims, 14 Drawing Sheets

(56) References Cited

OTHER PUBLICATIONS

Y. Hu, "CORDIC-Based VLSI Architecture for Digital Signal Processing," IEEE Signal Processing Magazine, pp. 17-35, Jul. 1992.
R. Sarmineto et al., "A CORDIC Processor for FFT Computations and Its Implementation Using Gallium Arsenide Technology," IEEE Trans. on VLSI Systems, pp. 18-30, vol. 6, No. 1, Mar. 1998.
C. Ying et al., "Efficient CORDIC Designs for Multi-Mode OFDM FFT," ICASSP, pp. 1036-1039, vol. 3, May 2006.
B. Heyne et al., "A Pure CORDIC based FFT for Reconfigurable Digital Signal Processing," 12th European Signal Processing Conference (EUSIPCO2004), Vienna, Austria, 2004, pp. 1513-1516.
B. Heyne et al., "CORDIC-Based Algorithms for Software Defined Radio (SDR) Baseband Processing," Adv. Radio Sci., 4, 179-184, 2006.
S. Katsutoshi et al., "A Cordic-Based Reconfigrable Systolic Array Processor for MIM-OFDM Wireless Communications", IEEE Workshop for Signal Processing Systems, Oct. 1, 2007, pp. 639-644.

\* cited by examiner

CORDIC-BASED FFT AND IFFT APPARATUS AND METHOD

FIELD OF THE INVENTION

This invention relates to a CORDIC-based digital signal processing system and, more particularly, to CORDIC-BASED FFT AND IFFT apparatus and method.

BACKGROUND OF THE INVENTION

In general, an N-point FFT (Fast Fourier Transform) is expressed mathematically as [1]

$$X_k = \sum_{n=0}^{N-1} x_n e^{-\frac{i2\pi nk}{N}}, \quad (1)$$

where $x_n$ is the $n^{th}$ element of a discrete time signal vector $x=[x_0 \ldots x_{N-1}]$ with N data samples, and $X_k$ is the $k^{th}$ element of vector $X=[X_0 \ldots X_{N-1}]$ that corresponds to FFT of x. In general, both $x_n$ and $X_k$ can be considered as complex numbers. Direct implementation of an FFT using (1) is always avoided due to its extremely high computation load especially when N is large. Thus, instead of directly implementing (1), an N-point FFT or IFFT (Inverse Fast Fourier Transform) is always implemented using stages of small-sized FFT or IFFT units. As an example, an 8-point FFT can be implemented using three stages each comprising four 2-point FFT operations.

Further, in order to reduce processing latency while increasing throughput of a device that implements FFT/IFFT operations, a number of processors are used in parallel. FIG. 1 shows a typical parallel-based mode of implementing an 8-point IFFT/FFT [1]. In FIG. 1, circled regions represent processors that operate in parallel. Of these regions, the shaded ones, "●", represent multiplication by twiddle factor, while regions marked with un-shaded "○" represents addition operations.

FFT has conventionally been implemented using DSP (Digital Signal Processor), parameterized ASIC (Application Specific Integrated Circuit), IP (intellectual property) cores, FPGA (Field Programmable Gate Array) and reconfigurable processors. It has been noted that when a processor is based on CORDIC (coordinate rotation digital computer) [2], the resulting FFT utilizes less hardware resources in comparison to MAC (Multiply and Accumulate) based processors. This is especially so when the size of FFT is large. Whereas there are hybrid processors based on a combination of CORDIC and ADDER units [3], or CORDIC and FFT/IFFT Kernel [2][P1], this patent consider processors which are purely based on CORDIC [4][5][6].

As an example, FIG. 2 shows a conventional FFT based on CORDIC for processing FFT of a vector with two data samples "s1" and "s2", and generating two output data samples "S1" and "S2". An intermediate signal S'2 is generated by a pair of CORDIC processors. This pair of CORDIC processors has been labeled I.

The intermediate signal S'2 is given by $$S'2 = -2^{-0.5}(s1-s2) \quad (2)$$

Therefore, output signals "S1" and "S2" are related to the input samples "s1" and "s2" by the following equations:

$$S1 = 2^{-0.5}(s1+s2)$$

$$S2 = 2^{-0.5}(s1-s2) \quad (3)$$

From (1), FFT [S1' S2'] of [s1 s2] is given by $$S1' = (s1+s2)$$

$$S2' = (s1-s2) \quad (4)$$

[Non-Patent Document 1]
J. G. Proakis and D. G. Manolakis, Introduction to Digital Signal Processing, Maxwell Macmillan, 1989

[Non-Patent Document 2]
Y. H. Hu, "CORDIC-Based VLSI Architecture for Digital Signal Processing," IEEE Signal Processing Magazine, pp. 16-July 1992

[Non-Patent Document 3]
R. Sarmineto, F. Tobajas, et. al, "A CORDIC Processor for FFT Computations and Its Implementation Using Gallium Arsenide Technology," IEEE Trans. on VLSI Systems, pp. 18-30, vol. 6, no. 1, March 1998

[Non-Patent Document 4]
C. Ying, S. Chen and J. Chih, "Efficient CORDIC Designs for Multi-Mode OFDM FFT," ICASSP Page(s): 1036-1039, vol. 3, May 2006

[Non-Patent Document 5]
B. Heyne, J. Gotze, "A Pure CORDIC based FFT for Reconfigurable Digital Signal Processing," $12^{th}$ European Signal Processing Conference (EUSIPCO2004), Vienna, Austria, 2004

[Non-Patent Document 6]
B. Heyne, J. Gotze, "CORDIC-Based algorithms for software defined Radio (SDR) baseband Processing," Adv. Radio Sci., 4, 179-184, 2006

[Patent Document 1]
Kulkarni et al., "Reconfigurable Vector-FFT/IFFT, Vector-Multiplier/Divider," U.S. Pat. No. 7,082,451 B2

SUMMARY

The entire disclosures of the above mentioned Non-Patent Documents and Patent Document are herein incorporated by reference thereto. The analysis below described is given by the present invention.

From the equations (2) and (3), it can be said that conventional purely CORDIC based FFT requires a processor that perform only sign reversal operation.

For large size radix-2 based FFT or IFFT, the sign reversal operation ends up consuming significant amount or resources.

Another example is given in FIG. 3 for the case of an 8-point FFT [5][6]. With reference to FIG. 3, there are provide first, second and third stages, each including four pairs of CORDIC processors. In FIG. 3, the pairs of CORDIC processors that have been labeled as I, II and III, are given in FIGS. 2, 4 and 5, respectively.

As in the case of a 2-point FFT that has been explained above, additional CORDIC processors are used to perform sign reversal in order to generate scaled results of an 8-point FFT.

As described above, the conventional purely CORDIC based FFT or IFFT requires additional processing steps or processors for performing sign reversal.

The minimization of computational load in a purely CORDIC-based processor that is used to implement FFT or IFFT is demanded.

Accordingly, it is an object of the present invention to provide an apparatus and method which may reduce hardware resources or processing steps in a CORDIC-based FFT or IFFT.

In one aspect (first) of the present invention, there is provided an apparatus for performing a 2-point FFT (Fast Fourier Transform) wherein first and second complex input signals ('s1' and 's2') are evaluated to generate 2-point FFT's first and second complex output signals ("S1" and "S2"), said apparatus comprising first and second CORDIC processors (C1 and C2), each of the first and second CORDIC processors including:

first and second input ports ('p1' and 'p2') that respectively represent real input port and imaginary input port; and first and second output ports ('P1' and 'P2') that respectively represent real output port and imaginary output port for outputting rotated data; wherein real part of the first input signal ('s1') is applied to the imaginary input port ('p2') of the first CORDIC processor (C1);

imaginary part of the first input signal ('s1') is applied to the imaginary input port ('p2') of the second CORDIC processor (C2);

real part of the second input signal ('s2') is applied to the real input port ('p1') of the first CORDIC processor (C1);

imaginary part of the second input signal ('s2') is applied to the real input port ('p1') of the second CORDIC processor (C2);

the first and second CORDIC processors (C1 and C2) rotate the respective input signals by 45 degrees in the clockwise direction;

data from real output port ('p1') of said first CORDIC processor (C1), and data from real output port ('p1') of the second CORDIC processor (C2), constitute respectively real part and imaginary part of the 2-point FFT's first output signal ("S1"); and data from the imaginary output port ('p2') of said first CORDIC processor (C1), and data from the imaginary output port ('p2') of said second CORDIC processor (C2) constitute respectively real part and imaginary part of the 2-point FFT's second output signal ("S2").

In another aspect (second aspect) of the present invention, there is provided an apparatus for performing a 2-point FFT (Fast Fourier Transform), first and second complex input signals ('S1' and 's2') are evaluated to generate 2-point FFT's first and second complex output signals ("S1" and "S2"), said apparatus comprising first and second CORDIC processors (C1 and C2), each of said first and second CORDIC processors comprising at least first and second input ports ('p1' and 'p2') that respectively represent real input port and imaginary input port; and at least first and second output ports ('P1' and 'P2') that respectively represent real output port and imaginary output port for outputting rotated data; wherein real part of said first input signal ('s1') is applied to the real input port of the first CORDIC processor (C1);

imaginary part of said first input signal ('s1') is applied to the real input port of the second CORDIC processor (C2);

real part of the second input signal ('s2') is applied to the imaginary input port of the first CORDIC processor (C1);

imaginary part of the second input signal ('s2') is applied to the imaginary part of the second CORDIC processor (C2);

the first and second CORDIC processors (C1 and C2) rotate respective input signals applied thereto by 45 degrees in the anticlockwise direction;

data from imaginary output port of the second CORDIC processor (C2), and data from the imaginary output port of the first CORDIC processor (C1), constitute respectively real part and imaginary part of the 2-point FFT's first output signal ("S1"); and data from real output port of the second CORDIC processors (C2), and data from the real output port of the first CORDIC processors (C1), constitute respectively real part and imaginary part of the 2-point FFT's second output signal ("S2").

In a third aspect of the present invention, there is provided an apparatus for performing a 4-point FFT, said apparatus comprising first and second stages for processing FFT of four complex data samples, the first stage comprising two 2-point FFT for processing four input signals of complex data (x1, x2, x3, x4);

a second stage for processing the output of the first stage using two 2-point FFT;

wherein in the first stage, data is processed as set forth in first or second aspect.

In a fourth aspect of the present invention, there is provided an apparatus for performing a 4-point FFT, said apparatus comprising first and second stages for processing FFT of four complex data samples, the first stage comprising two 2-point FFT for processing input signals of complex data (x1, x2, x3, x4);

the second stage for processing the output of the first stage using first and second pair of CORDIC processors;

each of the first and second CORDIC processors including at least first and second input ports ('p1' and 'p2') that respectively represent real input port and imaginary input port; and at least first and second output ports ('P1' and 'P2') that respectively represent real output port and imaginary output port for outputting rotated data;

wherein in the second stage of the FFT, input signals (a1, a2) into the first pair of CORDIC processors is processed as stated in the first or second aspect;

input signals (a3, a4) into the second pair of CORDIC processors is processed as follows:

applying real part of the first input signal ('a3') to the real input port of the first CORDIC processor (C1) of the second pair of CORDIC processors;

applying imaginary part of the first input signal ('a3)' to the real input port of the second CORDIC processor (C2) of the second pair of CORDIC processors;

applying real part of the second input signal ('a4') to the imaginary input port of the first CORDIC processor (C1) of the second pair of CORDIC processors; and applying imaginary part of the second input signal ('a4') to the imaginary input port of the second CORDIC processor (C2) of the second pair of CORDIC processors;

two CORDIC processors (C1 and C2) of the second pair of CORDIC processors, rotate respective input signals applied thereto by 45 degrees in the anticlockwise direction;

imaginary output port of first CORDIC processor (C1), and real output port of the second CORDIC processor (C2) in the second pair of CORDIC processors, constitute respectively real part and imaginary part of the third output signal ("S2") from the second stage of the FFT;

real output port of first CORDIC processor (C1), and data from the imaginary output port of the second CORDIC processor (C2) in the second pair of CORDIC processors, constitute respectively real part and imaginary part of the fourth output signal ("S3") from the second stage of the FFT.

In a fifth aspect of the present invention, there is provided an apparatus for performing an 8-point FFT, comprising three stages for processing FFT of eight complex data samples;

the first stage comprising two pairs of 4-point FFT for processing eight complex input signals (s1, s2, . . . , s8) and generate eight complex output signals;

the output of said two pairs of 4-point FFT being multiplied by twiddle factors in the second stage to generate an output for being processed by the third stage of the 8-point FFT;

the third stage comprising four pairs of 2-point FFT, wherein the 2-point FFT in the third stage, data is processed has as set forth in first aspect or second aspect.

In a sixth aspect of the present invention, there is provided an apparatus for performing an 8-point FFT comprising three stages for processing FFT of eight complex data samples;

the first stage comprising two pairs of 4-point FFT for processing the eight samples of complex input signals (s1, s2, . . . , s8) and generate eight samples of complex output signals;

the output of said pairs of 4-point FFT being selectively multiplied by twiddle factors or rotated by an equivalent rotational angle in the second stage to generate an output for being processed by the third stage of the 8-point FFT;

the third stage comprising four pairs of CORDIC processors;

each of the CORDIC processors in the four pairs of CORDIC processors comprising at least two input ports ('p1' and 'p2') that respectively represent real input port and imaginary input port; and at least first and second output ports ('P1' and 'P2') that respectively represent real output port and imaginary output port for outputting rotated data;

wherein the third stage, one of the pairs of CORDIC processors process two input signals (a8 and a9) of complex data applied thereto to generate two output signals (A8 and A9) as follows:

applying real part of the first input signal ('a8') to the real input port of the first CORDIC processor (C1) of the pair of CORDIC processors;

applying imaginary part of the first input signal ('a8)' to the real input port of the second CORDIC processor (C2) of the pair of CORDIC processors;

applying real part of second input signal ('a9') to the imaginary input port of the second CORDIC processor (C2) of the pair of CORDIC processors;

applying imaginary part of second input signal ('a9') to the imaginary input port of the first CORDIC processor (C1) of the pair of CORDIC processors;

wherein two CORDIC processors (C1 and C2), of the pair of CORDIC processors, rotate respective input signals applied thereto by 45 degrees in the anticlockwise direction;

data from the imaginary output port of first CORDIC processor (C1), and data from the real output port of the second CORDIC processor (C2) in the second pair of real number CORDIC processors, constitute respectively real part and imaginary part of the first output signal;

data from the real output port of first CORDIC processor (C1), and data from the imaginary output port of the second CORDIC processor (C2) in the second pair of CORDIC processors, constitute respectively real part and imaginary part of the second output signal.

In a seventh aspect of the present invention, there is provided an apparatus for performing an FFT comprising multiple stages for processing FFT of complex data samples, with at least one stage implemented using at least one 2-point FFT, wherein in the stage implementing 2-point FFT, at least one of the 2-point FFT will process data as set forth in first or second aspect.

In an eighth aspect of the present invention, there is provided an apparatus for performing an FFT comprising multiple stages for processing FFT of complex data samples with at least one stage implemented using 4-point FFT, wherein the stage, at least one of the 4-point FFT data will be processed as set forth in third aspect or fourth aspect.

In a ninth aspect of the present invention, there is provided an apparatus for performing an FFT comprising multiple stages for processing FFT of complex data samples with at least one stage implemented using 8-point FFT, wherein the stage, at least one of the 8-point FFT data will be processed as set forth in fifth aspect or sixth aspect.

In a tenth aspect of the present invention, there is provided a processor for processing four complex data samples (a1, a2, a3 and a4), said processor comprising two pairs of CORDIC processors with at least two CORDIC processors (C1 and C2) for rotating second (a4) complex input signals applied thereto in the clockwise direction by 90 degrees and evaluating a 2-point FFT of the first input signal sample (a3) and rotated second input signal sample;

each the CORDIC processors comprising at least first and second input ports ('p1' and 'p2') that respectively represent real input port and imaginary input port; and at least first and second output ports ('P1' and 'P2') that respectively represent real output port and imaginary output port for outputting rotated data, where in the processor, first and second input signals into the first pair of CORDIC processors are processed as defined in the first aspect or second aspect and third and fourth input signals ('a3' and 'a4') into the second pair of CORDIC processors are processed as follows:

applying real part of the third input signal ('a3') to the real input port of the first CORDIC processor (C1) of the second pair of CORDIC processors;

applying imaginary part of the third input signal ('a3') to the real input port of the second CORDIC processor (C2) of the second pair of CORDIC processors;

applying real part of the fourth input signal ('a4') to the imaginary input port of the second CORDIC processor (C2) of the second pair of CORDIC processors;

applying imaginary part of the fourth input signal ('a4') to the imaginary input port of the second CORDIC processor (C2) of the second pair of CORDIC processors;

two CORDIC processors (C1 and C2) of the second pair of CORDIC processors, rotate respective input signals applied thereto by 45 degrees in the anticlockwise direction;

data from the imaginary output port of the first CORDIC processor (C1), and data from the real output port of the second CORDIC processor (C2) in the second pair of real number CORDIC processors, constitute respectively real part and imaginary part of a first output signal;

data from the real output port of first CORDIC processor (C1), and data from the imaginary output port of the second CORDIC processor (C2) in the second pair of CORDIC processors, constitute respectively real part and imaginary part of a second output signal.

In an eleventh aspect of the present invention, there is provided an apparatus for performing a 2-point IFFT comprising two CORDIC processors (C1 and C2), each comprising at least first and second input ports ('p1' and 'p2') that respectively represent real input port and imaginary input port; and at least first and second output ports ('P1' and 'P2') that respectively represent real output port and imaginary output port for outputting rotated data;

wherein in the 2-point IFFT, IFFT of two samples of complex input signals ('s1' and 's2') is evaluated to generate two output signal ("S1" and "S2"), real part of the first input signal ('s1') is applied to imaginary port ('p2') of the first CORDIC processor (C1);

imaginary part of the first input signal ('s1') is applied to imaginary port ('p2') of the second CORDIC processor (C2);

real part of second input signal ('s2') is applied to the real input port of the first CORDIC processor (C1);

imaginary part of second input signal ('s2') is applied to the real input port of the second CORDIC processor (C2);

two CORDIC processors (C1 and C2) rotate respective input signals applied thereto by 45 degrees in the clockwise direction;

data from the real output port ('p1') of first CORDIC processor (C1), and data from the real output port ('P1') of the second CORDIC processor (C2), constitute respectively real part and imaginary part of the 2-point IFFT's first output signal ("S1");

data from the imaginary output port ('P2') of first CORDIC processor (C1), and data from the imaginary output port of the second CORDIC processor (C2), constitute respectively real part and imaginary part of the 2-point IFFT's second output signal ("S2").

In a twelfth aspect of the present invention, there is provided an apparatus for performing a 2-point IFFT comprising two CORDIC processors (C1 and C2), each including at least first and second input ports ('p1' and 'p2') that respectively represent real input port and imaginary input port; and at least first and second output ports ('P1' and 'P2') that respectively represent real output port and imaginary output port for outputting rotated data;

wherein IFFT of two samples of complex input signals ('S1' and 's2') is evaluated as follows:

applying the real part of the first input signal ('s1') to the real input port of the first CORDIC processor (C1);

applying imaginary part of the first input signal ('s1') to the real input port of the second CORDIC processor (C2);

applying real part of second input signal ('s2') to the imaginary input port of the first CORDIC processor (C1); and applying imaginary part of second input signal ('s2') to the imaginary part of the second CORDIC processor (C2);

and generates two output signals ('S1' and 'S2'), wherein in the 2-point IFFT, the two CORDIC processors (C1 and C2) rotate respective input signals applied thereto by 45 degrees in the anticlockwise direction;

data from the imaginary output port of second CORDIC processor (C2), and data from the imaginary output port of the first CORDIC processor (C1), constitute respectively real part and imaginary part of the 2-point IFFT's first output signal ("S1"); and data from the real output port of second CORDIC processors (C2), and data from the real output port of the first CORDIC processors (C1), constitute respectively real part and imaginary part of the 2-point IFFT's second output signal ("S2").

In a thirteenth aspect of the present invention, there is provided an apparatus for performing a 4-point IFFT comprising two stages for processing IFFT of four complex data samples, the first stage comprising two 2-point IFFT for processing complex input signals (x1, x2, x3, x4);

the second stage processing the output of the first stage using two 2-point IFFT, where in the first stage of the 4-point IFFT:

data is processed as set forth in the eleventh aspect or twelfth aspect.

In a fourteenth aspect of the present invention, there is provided an apparatus for performing a 4-point IFFT comprising two stages for processing IFFT of four complex data samples, the first stage comprising two 2-point IFFT for processing complex input signals (x1, x2, x3, x4);

the second stage processing the output of the first stage using two pairs of CORDIC processors;

each of the CORDIC processors including at least first and second input ports ('p1' and 'p2') that respectively represent real input port and imaginary input port; and at least first and second output ports ('P1' and 'P2') that respectively represent real output port and imaginary output port for outputting rotated data;

wherein in the second stage of the IFFT, input signals (a1, a2) into the first pair of CORDIC processors is processed as set forth in the eleventh aspect or twelve aspect;

input signals (a3, a4) into the second pair of CORDIC processors is processed as follows:

applying real part of the first input signal ('a3') to the real input port of the first CORDIC processor (C1) of the second pair of CORDIC processors;

applying imaginary part of the first input signal ('a3') to the real input port of the second CORDIC processor (C2) of the second pair of CORDIC processors;

applying real part of second input signal ('a4') to the imaginary input port of the second CORDIC processor (C2) of the second pair of CORDIC processors;

applying imaginary part of second input signal ('a4') to the imaginary input port of the first CORDIC processor (C1) of the second pair of CORDIC processors; and two CORDIC processors (C1 and C2) of the second pair of CORDIC processors, rotating respective input signals applied thereto by 45 degrees in the anticlockwise direction;

wherein data from the real output port of first CORDIC processor (C1), and data from the imaginary output port of the second CORDIC processor (C2) in the second pair of CORDIC processors, constitute respectively real part and imaginary part of the third output signal ("X3") from the second stage of the IFFT; and data from the imaginary output port of first CORDIC processor (C1), and data from the real output port of the second CORDIC processor (C2) in the second pair of CORDIC processors, constitute respectively real part and imaginary part of the fourth output signal ("X4") from the second stage of the IFFT.

In a fifteenth aspect of the present invention, there is provided an apparatus for performing an 8-point IFFT comprising three stages for processing IFFT of eight complex data samples;

the first stage comprising two pairs of 4-point IFFT for processing the eight samples of complex input signals (s1, s2, . . . , s8) and generate eight complex output signals;

wherein the output of said two pairs of 4-point IFFT are multiplied by twiddle factors in the second stage to generate an output for being processed by the third stage of the 8-point IFFT;

the third stage comprising four pairs of 2-point IFFT, wherein in the 2-point IFFT in the third stage, data is processed as set forth in the eleventh aspect or twelfth aspect.

In a sixteenth aspect of the present invention, there is provided an apparatus for performing an 8-point IFFT comprising three stages for processing IFFT of eight complex data samples;

the first stage comprising two pairs of 4-point IFFT for processing the eight complex input signals (s1, s2, . . . , s8) and generate eight complex output signals;

the output of said pairs of 4-point IFFT being selectively multiplied by twiddle factors or rotated by an equivalent rotational angle in the second stage to generate an output for being processed by the third stage of the 8-point IFFT;

the third stage comprising four pairs of CORDIC processors;

each of the CORDIC processors in the four pairs of CORDIC processors comprising at least first and second input ports ('p1' and 'p2') that respectively represent real input port and imaginary input port; and at least first and second output ports ('P1' and 'P2') that respectively represent real output port and imaginary output port for outputting rotated data;

wherein in the third stage, one of the pairs of CORDIC processors process two input samples (a3 and a4) of complex data applied thereto as follows:

applying real part of the first input signal ('a3') to the real input port of the first CORDIC processor (C1) of the pair of CORDIC processors;

applying imaginary part of the first input signal ('a3') to the real input port of the second CORDIC processor (C2) of the pair of CORDIC processors;

applying real part of the second input signal ('a4') to the imaginary input port of the second CORDIC processor (C2) of the pair of CORDIC processors;

applying imaginary part of the second input signal ('a4') to the imaginary input port of the first CORDIC processor (C1) of the pair of CORDIC processors; and two CORDIC processors (C1 and C2) of the pair of CORDIC processors, rotating respective input signals applied thereto by 45 degrees in the anticlockwise direction;

wherein data from the real output port of first CORDIC processor (C1), and data from the imaginary output port of the second CORDIC processor (C2) in the second pair of real number CORDIC processors, constitute respectively real part and imaginary part of the first output signal; and data from the imaginary output port of first CORDIC processor (C1), and data from the real output port of the second CORDIC processor (C2) in the second pair of CORDIC processors, constitute respectively real part and imaginary part of the second output signal.

In a seventeenth aspect of the present invention, there is provided an apparatus for performing an IFFT comprising multiple stages for processing IFFT of complex data samples with at least one stage implemented using at least one 2-point IFFT, wherein in the stage implementing 2-point IFFT, at least one of the 2-point IFFT processes data as set forth in the eleventh or twelfth aspect.

In an eighteenth aspect of the present invention, there is provided an apparatus for performing an IFFT comprising multiple stages for processing IFFT of complex data samples with at least one stage implemented using 4-point IFFT, wherein in the stage, at least one of the 4-point IFFT processes data as set forth in the thirteenth or fourteenth aspect.

In a nineteenth aspect of the present invention, there is provided an apparatus for performing an IFFT comprising multiple stages for processing IFFT of complex data samples with at least one stage implemented using 8-point IFFT, wherein in the stage, at least one of the 8-point IFFT processes data as set forth in the fifteenth or sixteenth aspect.

In a twentieth aspect of the present invention, there is provided a processor for processing four samples of complex input signals (a1, a2, a3 and a4), the processor comprising two pairs of CORDIC processors with at least two CORDIC processors (C1 and C2) for rotating the second signal (a4) in the clockwise direction by 90 degrees and evaluating a 2-point IFFT of the first input signal (a3) and the rotated second input signal;

each the CORDIC processors comprising at least first and second input ports ('p1' and 'p2') that respectively represent real input port and imaginary input port; and first and second output ports ('P1' and 'P2') that respectively represent real output port and imaginary output port for outputting rotated data;

where in the processor, first and second input signals into the first pair of CORDIC processors are processed as defined in the twelfth aspect or thirteenth aspect; and third and fourth input signals ('a3' and 'a4') into the second pair of CORDIC are processed as follows:

applying real part of the first input signal ('a3') to the real input port of the first CORDIC processor (C1) of the second pair of CORDIC processors;

applying imaginary part of the first input signal ('a3') to the real input port of the second CORDIC processor (C2) of the second pair of CORDIC processors;

applying real part of second input signal ('a4') to the imaginary input port of the second CORDIC processor (C2) of the second pair of CORDIC processors;

applying imaginary part of second input signal ('a4') to the imaginary input port of the first CORDIC processor (C1) of the second pair of CORDIC processors; and two CORDIC processors (C1 and C2), of the second pair of CORDIC processors, rotating respective input signals applied thereto by 45 degrees in the anticlockwise direction;

wherein data from the real output port of first CORDIC processor (C1), and data from the imaginary output port of the second CORDIC processor (C2) in the second pair of CORDIC processors, constitute respectively real part and imaginary part of the first output signal; and data from the imaginary output port of first CORDIC processor (C1), and data from the real output port of the second CORDIC processor (C2) in the second pair of CORDIC processors, constitute respectively real part and imaginary part of the second output signal.

In a twenty-first aspect of the present invention, there is provided an apparatus for performing an IFFT comprising multiple stages for processing IFFT of complex data samples with at least one stage implemented using two CORDIC processors as set forth in the thirteen aspect.

In further aspects of the present invention, there are provided methods for performing FFT and IFFT, respectively, which will become apparent from the entire disclosure including claims and drawings.

Meritorious effect of the present invention is that FFT or IFFT result is obtained using only CORDIC processors, thus achieving reduction in operations or hardware resources.

Still other features and advantages of the present invention will become readily apparent to those skilled in this art from the following detailed description in conjunction with the accompanying drawings wherein examples of the invention are shown and described, simply by way of illustration of the mode contemplated of carrying out this invention. As will be realized, the invention is capable of other and different examples, and its several details are capable of modifications in various obvious respects, all without departing from the invention. Accordingly, the drawing and description are to be regarded as illustrative in nature, and not as restrictive.

PREFERRED MODES

A 2-Point FFT

Figure 1:
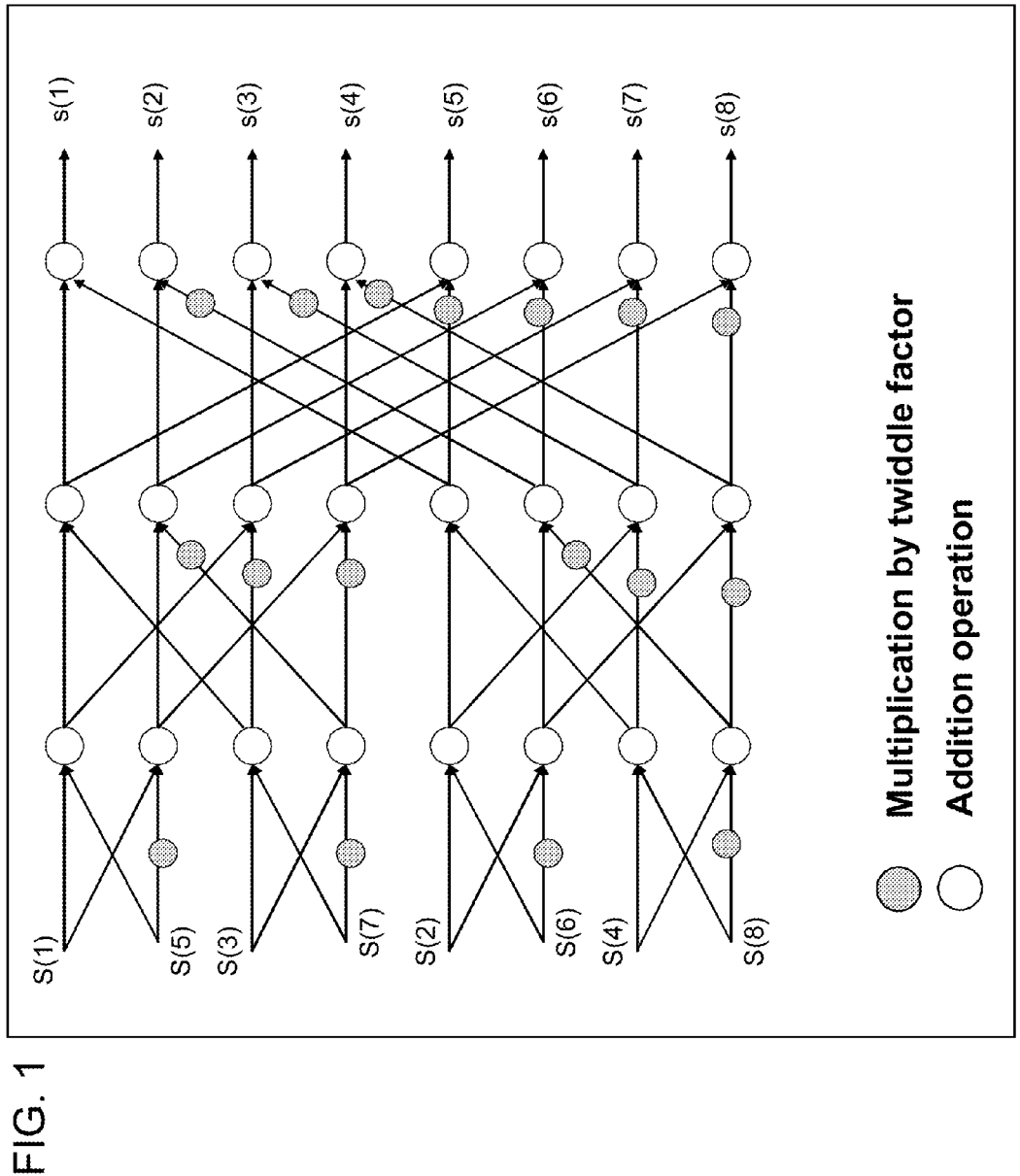
FIG. 1 is a diagram illustrating an example of 8-point FFT with parallel processing.
Figure 2:
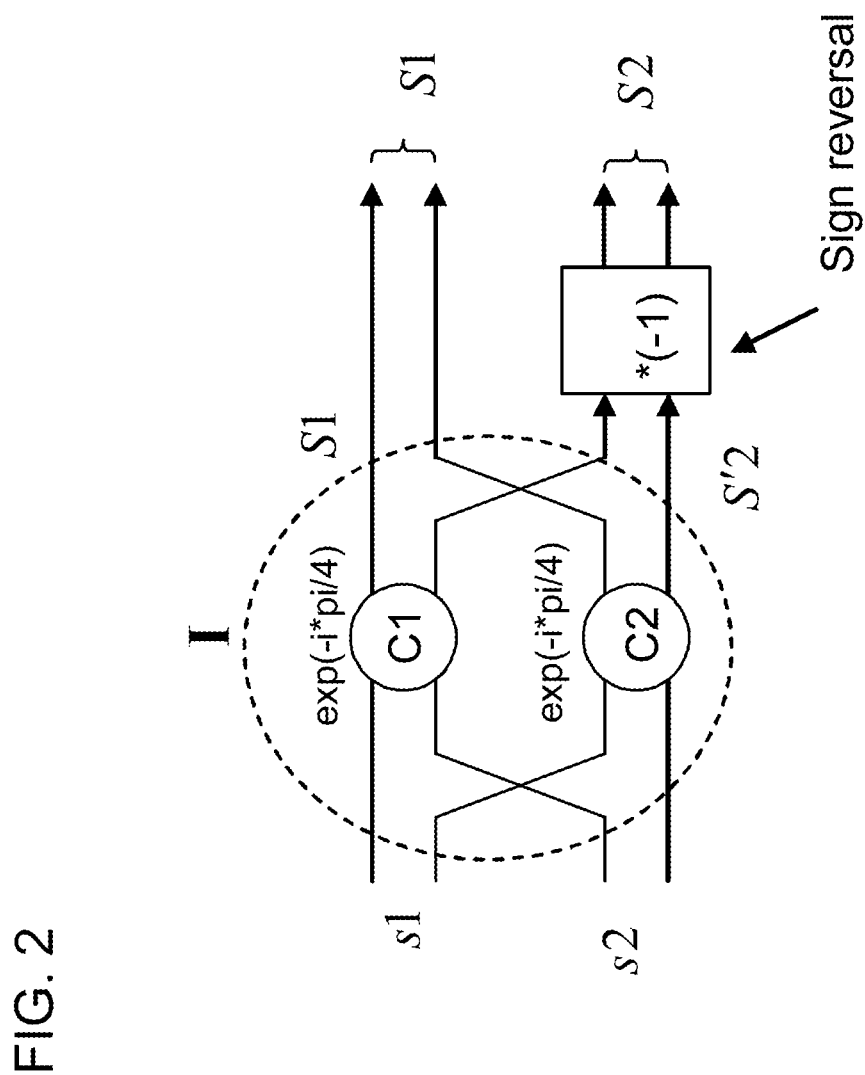
FIG. 2 is a diagram illustrating an example of 2-point FFT with an additional processor for sign reversal.
Figure 3:
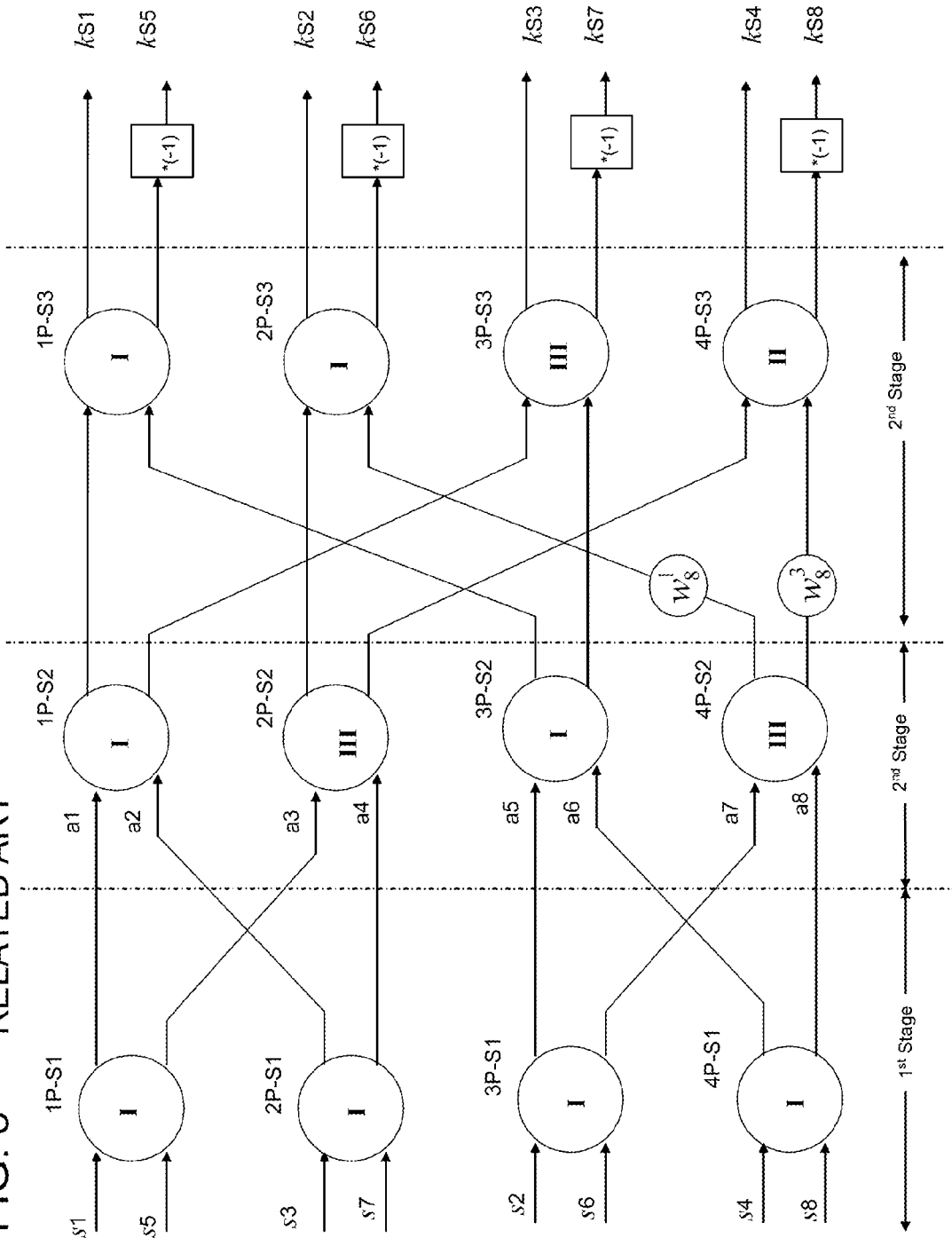
FIG. 3 is a diagram illustrating the configuration of related art for implementing an 8-point FFT using pairs of CORDIC processors (labeled I, II and III) that have been illustrated in FIGS. 1, 4 and 5, respectively.
Figure 4:
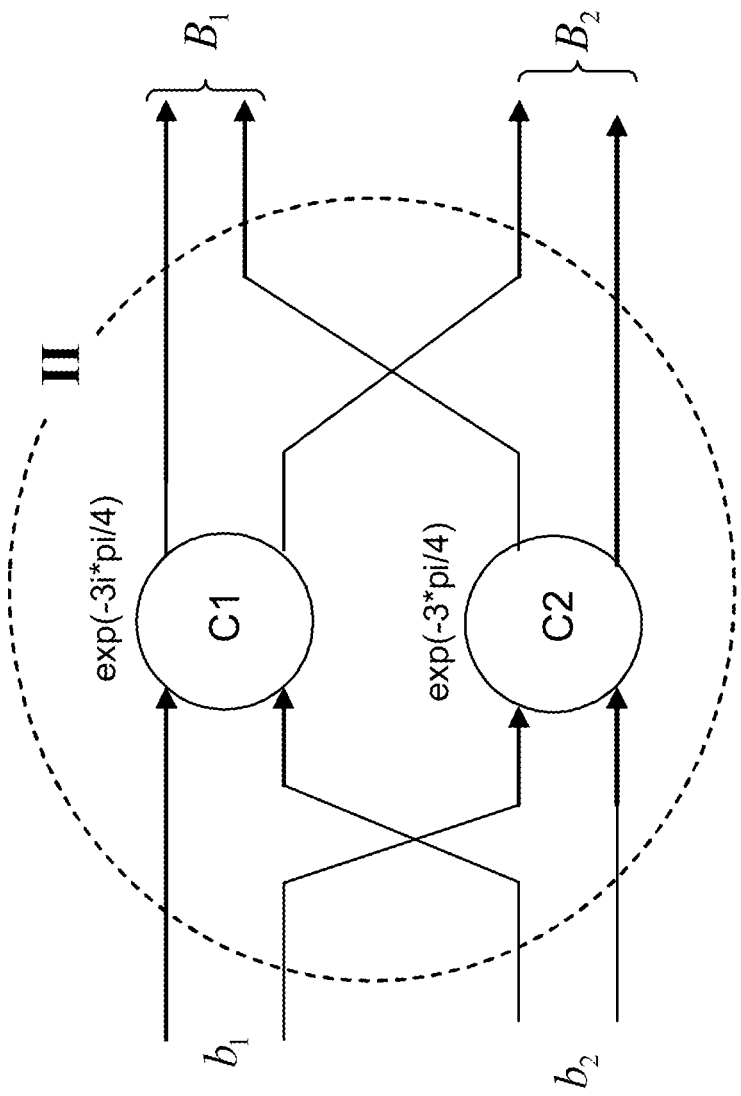
FIG. 4 is a diagram illustrating the configuration of related art for using a pair of CORDIC processors (II) in an 8-point FFT described in FIG. 3.
Figure 5:
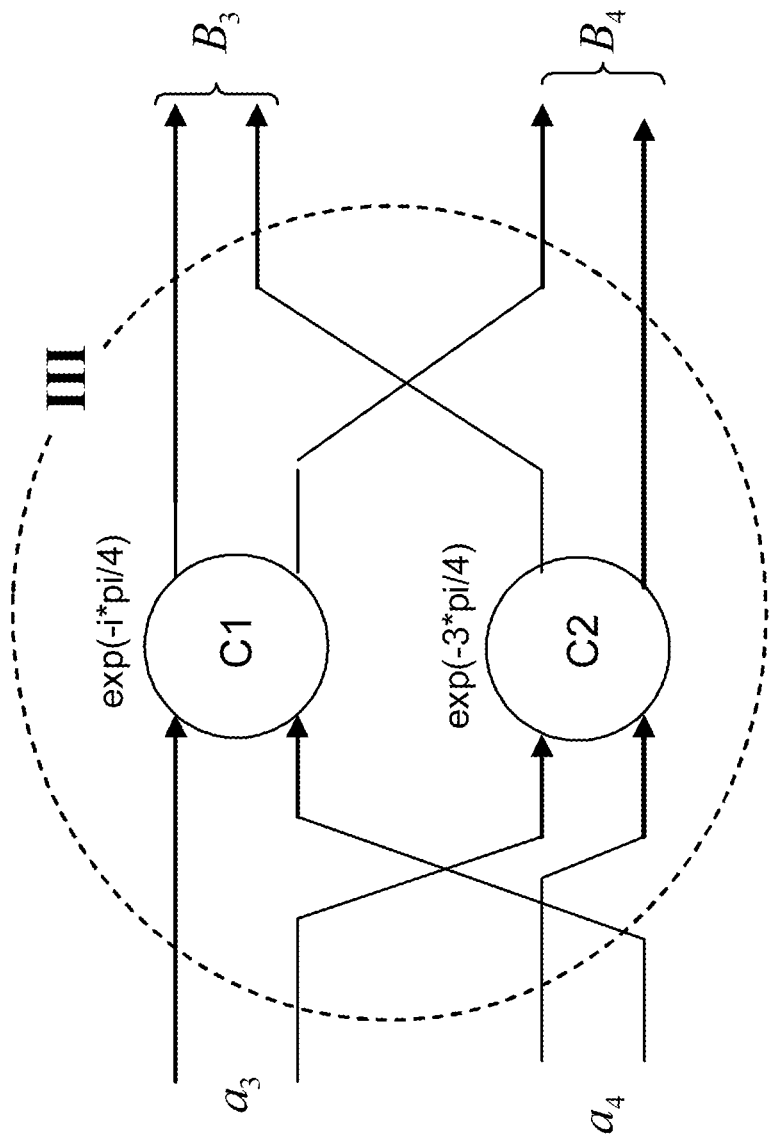
FIG. 5 is a diagram illustrating the configuration of related art for using a pair of CORDIC processors (III) in an 8-point FFT described in FIG. 3.
Figure 6:
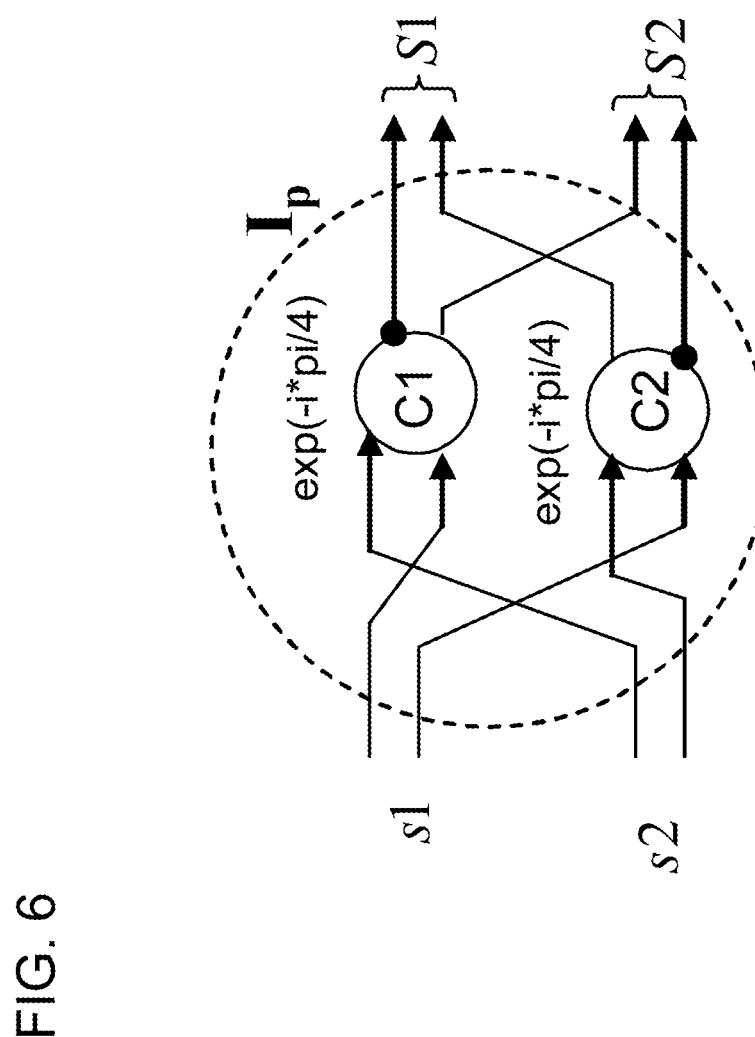
FIG. 6 is a diagram illustrating an example of the 2-point FFT using a pair of CORDIC processors according to the present invention.
Figure 7:
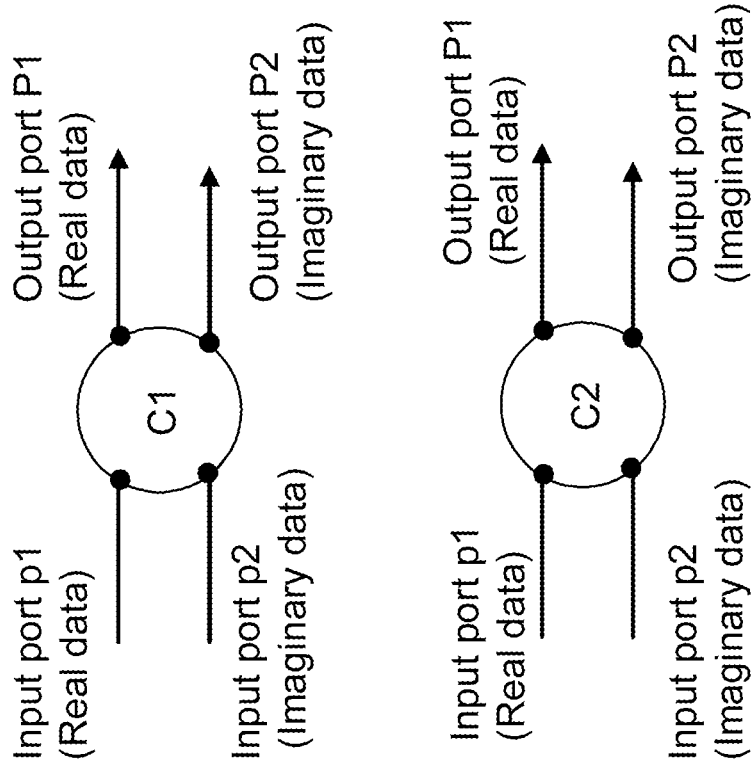
FIG. 7 is a diagram illustrating an example of two CORDIC processors, C1 and C2, which constitute a pair of CORDIC processors.

FIG. 6 shows the configuration of an example for implementing a 2-point FFT or IFFT using a pair of CORDIC processors according to the present invention. FIG. 7 is a diagram illustrating these two inputs and output ports of CORDIC processors (C1 and C2). With reference to FIG. 7, each of the CORDIC processors (C1 and C2) has at least two inputs (p1 and p2). Although the relative position of these inputs can always be changed, we assume that the top input (p1) represents a real number or the x-coordinate, while the bottom input port (p2) represents an imaginary number or the y-coordinate on the x-y plane. Similarly, there are at least two output ports with the top port (P1) and bottom port (P2) representing respectively the real part or x-coordinate and the imaginary part or y-coordinate.

Assume that we are given a vector (u1,u2) on the x-y plane with x-coordinate data (real data) u1 and a y-coordinate data (imaginary data) u2.

The CORDIC processor (C1) rotates (u1, u2) by an angle θ in the clockwise direction to generate an output (U1,U2), where U1 is the x-coordinate data and U2 is the resulting y-coordinate data.

$$U_1 = u_1 \cos(\theta) - u_2 \sin(\theta)$$

$$U_2 = u_2 \cos(\theta) + u_1 \sin(\theta) \quad (5)$$

Alternatively, $$U_1 + iU_2 = (u_1 + iu_2)e^{i\theta} \quad (6)$$

Now, consider a case where we need to calculate FFT of a vector with two complex data samples (input signals) s1 and s2. In the present invention, as shown in FIG. 6, real part of second data sample s2 and real part of first data sample s1 are respectively applied to real input port (p1) and imaginary input port (p2) of the first CORDIC processor (C1). Imaginary part of second data sample (s2) and imaginary part of the first data sample (s1) are respectively applied to real input port (p1) and imaginary input port (p2) of the second CORDIC processor (C2).

The respective inputs to each of the two CORDIC processors (C1) and (C2) are then rotated 45 degrees in the clockwise direction. Resulting output signals from CORDIC processors (C1 and C2) are then routed as follows:

As in the conventional method, output data from real port (p1) of first CORDIC processor (C1) and output data from real port (p1) of second CORDIC processor respectively constitute real and imaginary part of the first output data (S1) of a 2-point FFT data. The output data from imaginary port (p2) of first CORDIC processor (C1) and output data from imaginary port (p2) of second CORDIC processor (C2) respectively constitute real and imaginary part of the second output data (S2) of a 2-point FFT data.

<A 2-Point FFT>

Figure 8:
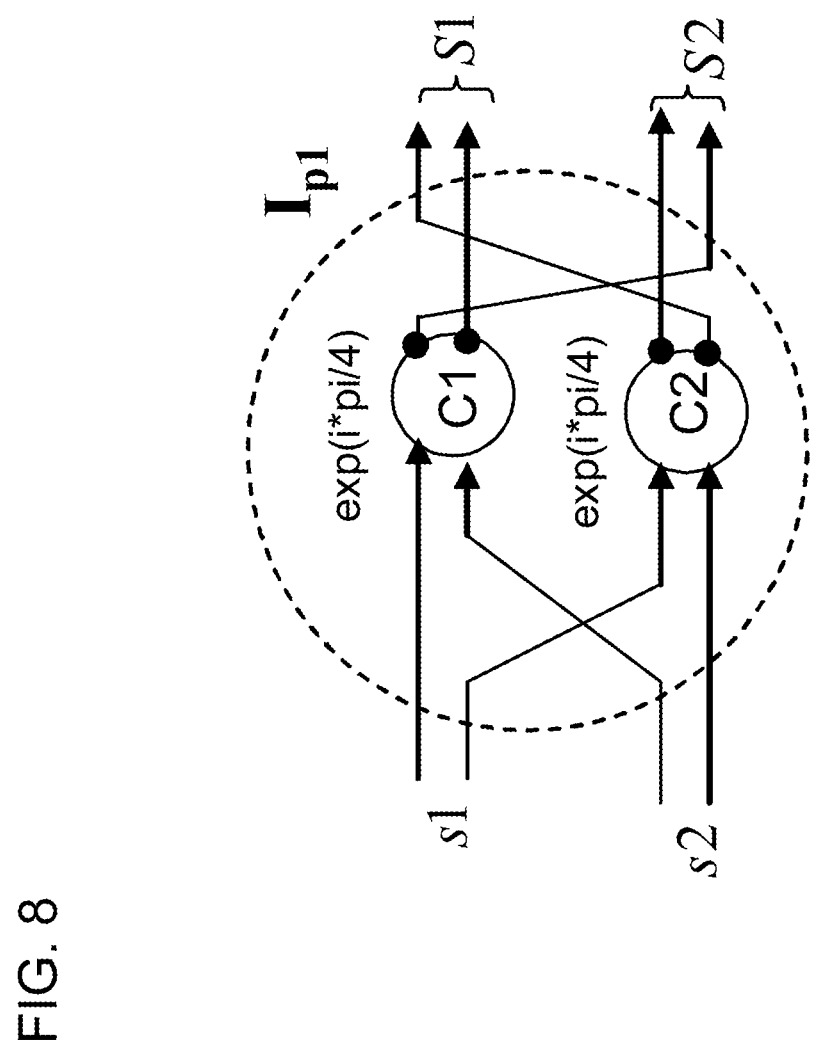
FIG. 8 is a diagram illustrating another example for implementing a 2-point FFT using a pair of CORDIC processors according to the present invention.

FIG. 8 shows an alternative example of the present invention which implements a 2-point FFT or IFFT. With reference to FIG. 8, real part of the first input signal s1 and real part of second input signal s2 are respectively applied to real input port (p1) and imaginary input port (p2) of the first CORDIC processor (C1). Further, imaginary part of the first input signal s1 and imaginary part of second input signal s2 are respectively applied to imaginary input port (p2) of the first CORDIC processor and imaginary input port (p2) of the second CORDIC processor (C2). The respective inputs to each of the two CORDIC processors (C1 and C2) are then rotated 45 degrees in the anticlockwise direction. Resulting output data (signal) from each of the two CORDIC processor (C1 and C2) are the routed as follows:

Output data from imaginary port (p2) of the second CORDIC processor (C2) and output data from imaginary port (p2) of the first CORDIC processor (C1) respectively constitute real and imaginary part of the first output data (S1) of a 2-point FFT data.

The output data from real port (p1) of first CORDIC processor (C1) and output data from real port (p1) of second CORDIC processor (C2) respectively constitute imaginary and real part of the second output data (S2) of a 2-point FFT data.

<A 2-Point FFT with Twiddle Factor at One of its Input>

In an N-point FFT or IFFT that can be factored, FFT or IFFT implementation can be done in stages. The results of a previous stage are multiplied by twiddle factors before being applied to the next stage. Typical twiddle factors are expressed as $Tw_{n,k} = e^{2i\pi nk/N}$. As an example, for a 4-point FFT, n={0,1} and k={0,1}.

Figure 10:
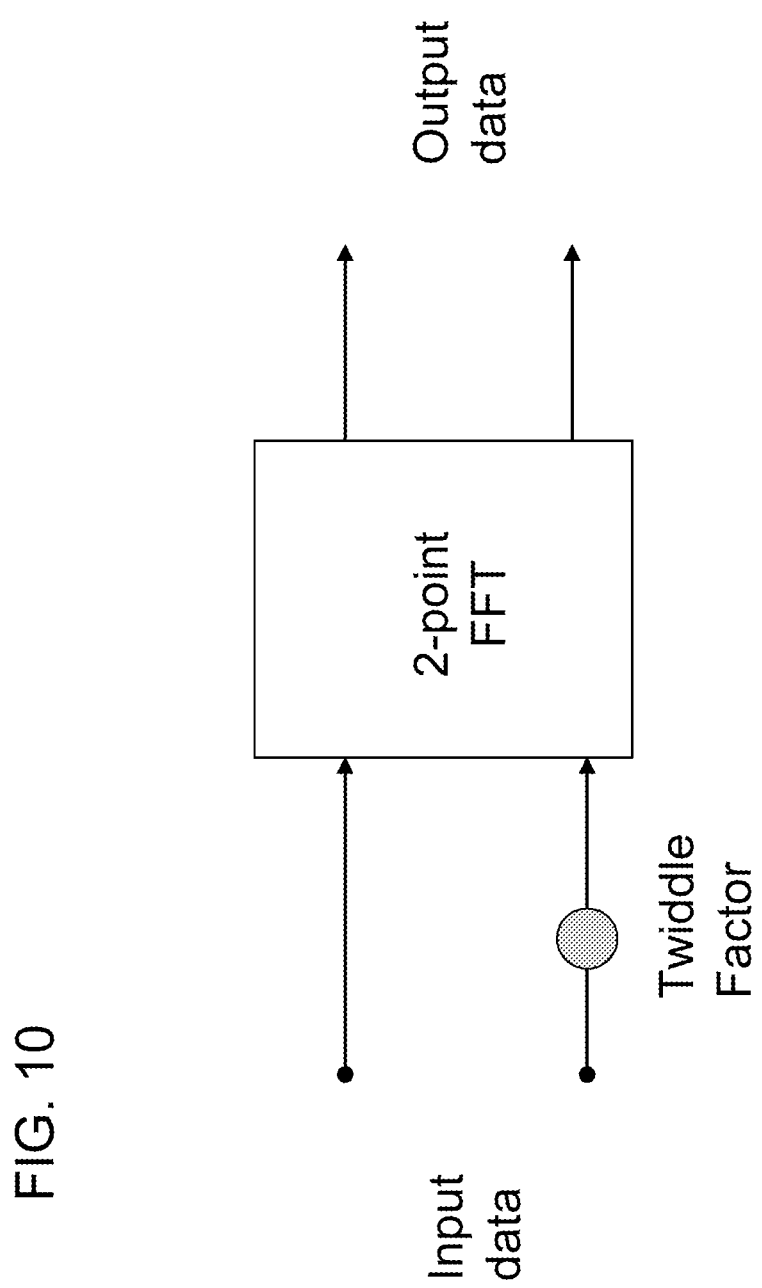
FIG. 10 is a diagram illustrating the configuration of a system of an example for computing 2-point FFT of data that is pre-multiplied with a twiddle factor.

FIG. 10 illustrates a system where two complex data samples are first multiplied with a twiddle factor before computing a 2-point FFT. In this case, the twiddle factor corresponds to $e^{2i\pi/4}$.

Another aspect of the present invention is described for implementing the system described in FIG. 10 using a pair of CORDIC processors.

Figure 9:
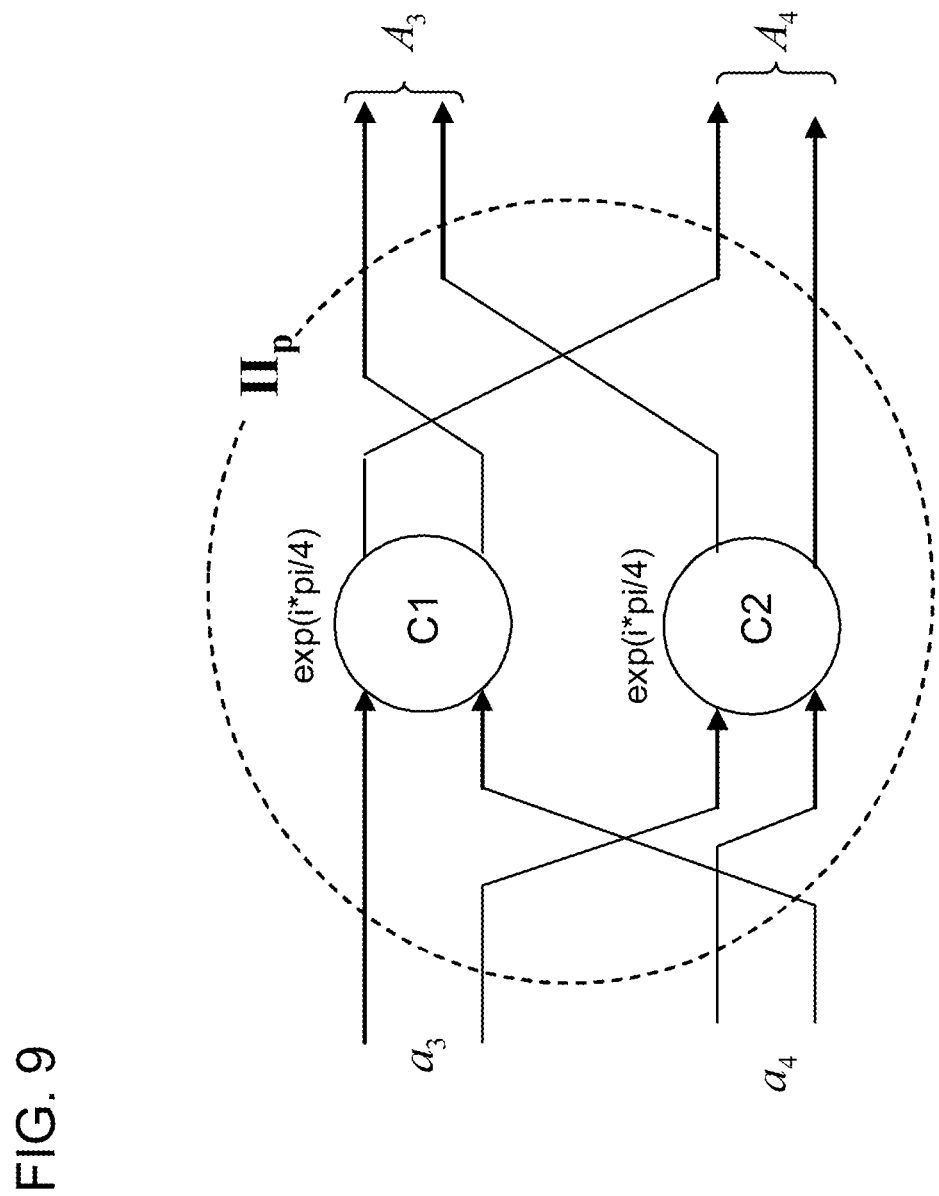
FIG. 9 is a diagram illustrating the configuration of an example of the present invention, using the second pair of CORDIC processors in the second stage of a 4-point FFT illustrated in FIG. 12.

FIG. 9 shows the configuration of another example for performing the 2-point FFT using two CORDIC processors. In FIG. 9, for two input complex data samples $a_3$ and $a_4$, the aim is to evaluate 2-point FFT of samples $a_3$ and $a_4 e^{i\pi/2}$.

With reference to FIG. 9, real part of first data $a_3$ and imaginary part of second data $a_4$ are respectively applied to real input port (p1) and imaginary input port (p2) of the first CORDIC processor (C1). Further, imaginary part of first data $a_3$ and real part of second data $a_4$ are respectively applied to real input port (p1) and imaginary input port (p2) of the second CORDIC processor (C2).

The respective inputs to each of the two CORDIC processors (C1) and (C2) are then rotated by 45 degrees in the anticlockwise direction. Resulting output data (signal) from each CORDIC processor are then routed as follows:

Output data from imaginary port (p2) of the first CORDIC processor (C1) and output data from real port (p1) of second CORDIC (C2) processor respectively constitute real and imaginary part of the first output data ($A_3$).

The output data from real port (p1) of first CORDIC processor (C1) and output data from imaginary port (p2) of second CORDIC processor (C2) respectively constitute real and imaginary part of the second output data ($A_4$).

In IFFT, twiddle factors takes on complex conjugate of equivalent twiddle factors in an FFT. Thus, rather than use $e^{2i\pi/4}$, a 4-point IFFT uses $e^{-2i\pi/4}$ as its twiddle factor.

Figure 11:
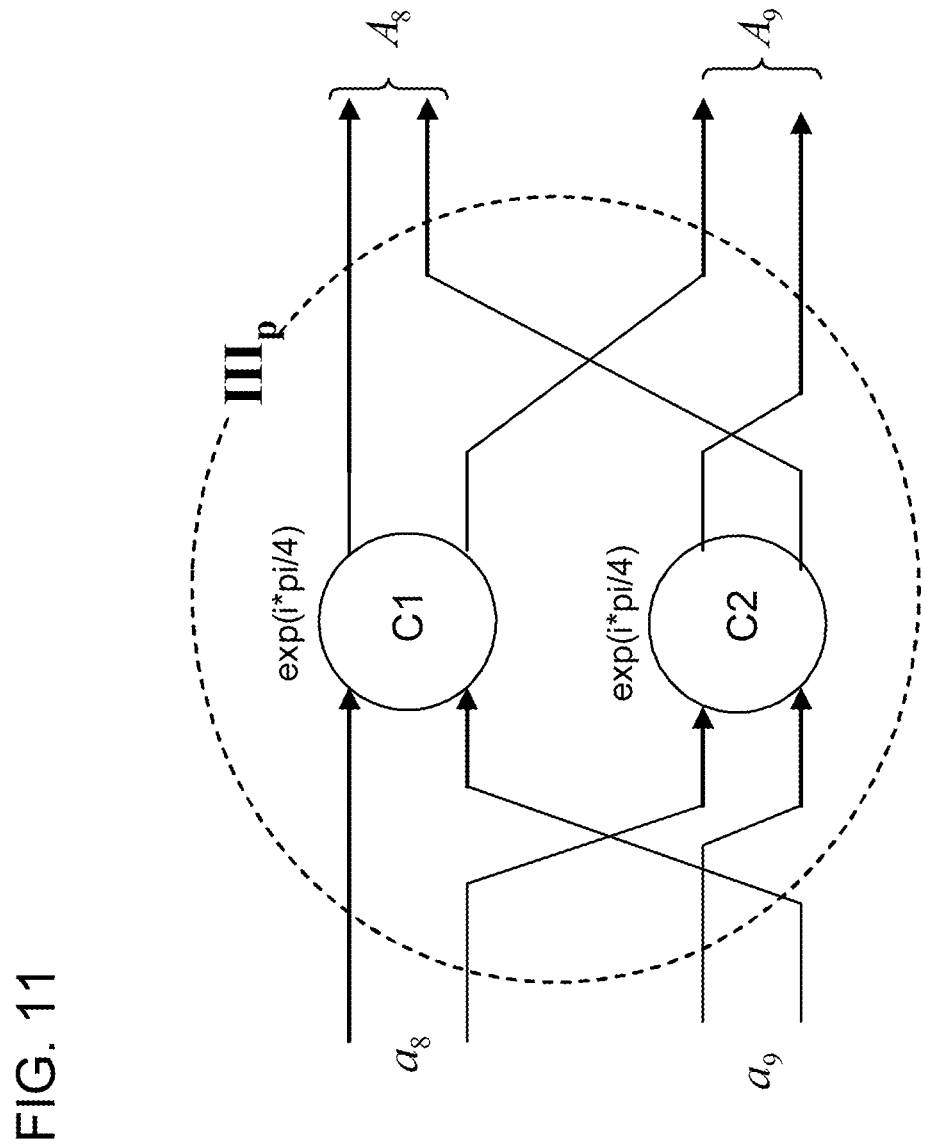
FIG. 11 is a diagram illustrating the configuration of an example according to the present invention, using a pair of CORDIC processors (IIIp) in an 8-point IFFT in FIG. 14.

FIG. 11 illustrates an example or the present invention for evaluating 2-point IFFT of samples $a_3$ and $a_4 e^{-i\pi/2}$ given two inputs $a_3$ and $a_4$ samples of data. In FIG. 11, real part of first data $a_8$ and imaginary part of second data $a_9$ are respectively applied to real input port (p1) and imaginary input port (p2) of the first CORDIC processor (C1). Further, imaginary part of first data $a_8$ and real part of second data $a_9$ are respectively applied to real input port (p1) of the first CORDIC processor (C1) and imaginary input port (p2) of the second CORDIC processor (C2). The respective inputs to each of the two CORDIC processors (C1) and (C2) are then rotated 45 degrees in the anticlockwise direction. Resulting output data (signal) from each CORDIC processor are the routed as follows:

Output data from real port (p1) of the first CORDIC processor (C1) and output data from imaginary port (p2) of second CORDIC (C2) processor respectively constitute real and imaginary part of the first output data ($A_8$).

The output data from imaginary port (p2) of first CORDIC processor (C1) and output data from imaginary port (p2) of second CORDIC processor (C2) respectively constitute real and imaginary part of the second output data ($A_9$).

Performance of the proposed ideas can be explained as follows:

In a 2-point FFT proposed in FIG. 6, output will given by $$s_1 = 2^{-0.5}(s_1 + s_2)$$

$$s_2 = 2^{-0.5}(s_1 - s_2) \quad (7)$$

This is equivalent to scaled FFT of a vector $[s_1\ s_2]$. It clear from FIG. 6 that FFT result is obtained using only two CORDIC processors which then results is a reduction in complexity. Output from an alternative CORDIC based 2-point FFT that has been illustrated in FIG. 8, is also given by (7).

<A 4-Point FFT>

Figure 12:
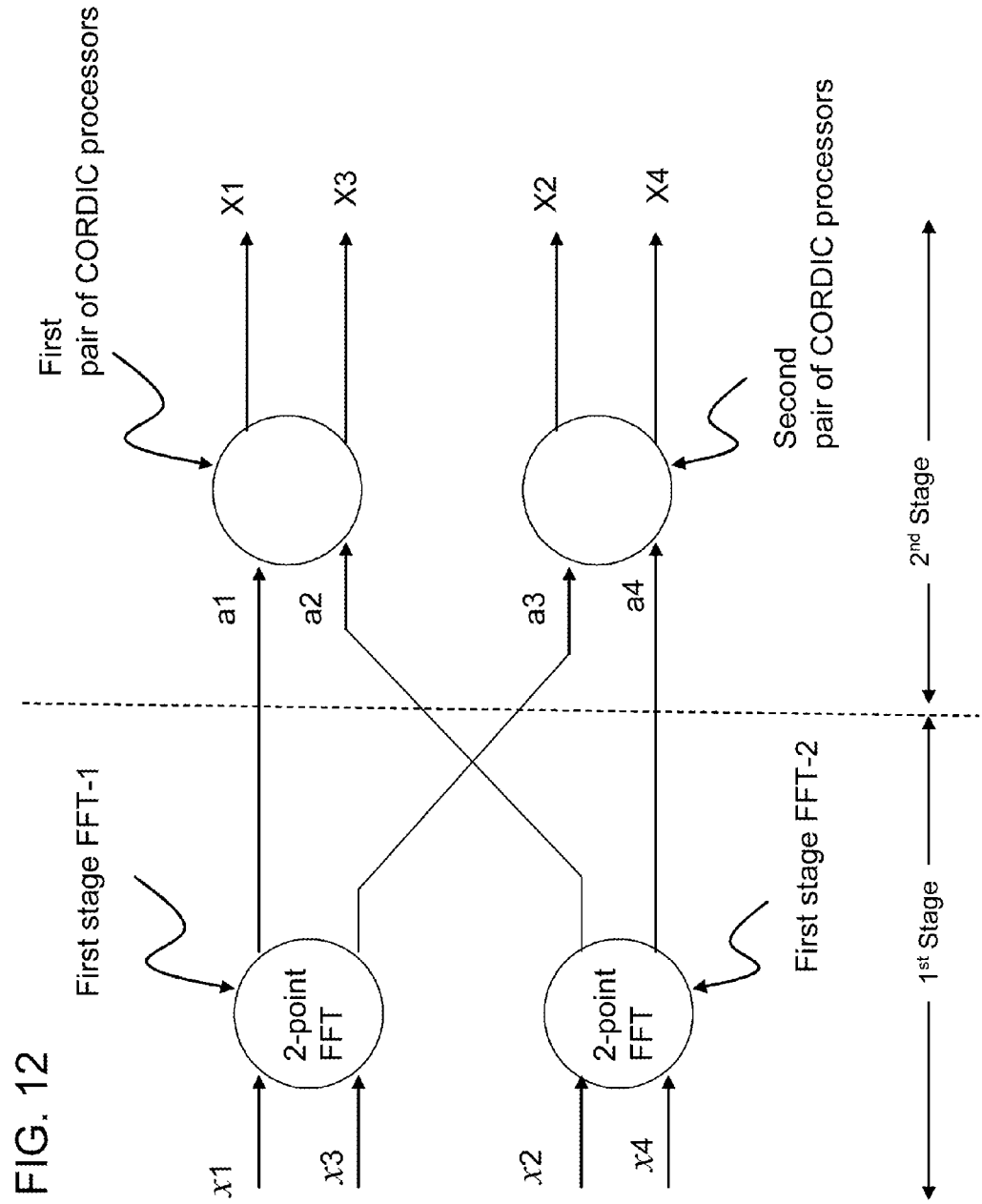
FIG. 12 is a diagram illustrating the configuration of an example according to the present invention for implementing a 4-point FFT.

FIG. 12 shows one example of FFT where the present invention can be applied. With reference to FIG. 12, 4-point FFT of four samples of data $[x_1\ x_2\ x_3\ x_4]$ is implemented using two stages of processing.

In the first stage, there are two pairs of CORDIC processors. First stage FFT-1 includes two CORDIC processors configured as shown in FIG. 6 or FIG. 8. First stage FFT-2 includes two CORDIC processors configured as shown in FIG. 6 or FIG. 8. Each pair of the CORDIC processors has input and output ports as described in FIG. 7.

The first pair FFT-1 computes 2-point FFT of data samples $[x_1\ x_3]$ while the second pair of CORDIC processors FFT-2 computes 2-point FFT of $[x_2\ x_4]$.

Computation of 2-point FFT is based on the design proposed in FIG. 6 or FIG. 8.

Outputs from these two pairs of CORDIC processors are $[a_1\ a_3]$ and $[a_2\ a_4]$, respectively. The output data from the first stage is then processed in the second stage as follows:

Evaluate 2-point FFT of two samples of data, $[a_1\ a_2]$, using the first pair of CORDIC processors (FFT-3) in second stage of a 4-point FFT. Once again, the 2-point FFT can be implemented using the design proposed in FIG. 6 or FIG. 8.

Next, 2-point FFT of two samples of data $[a_3\ a_4 e^{-i\pi/2}]$ is evaluated using the second pair of CCORDIC processors (FFT-4) in the second stage of a 4-point FFT.

This operation is implemented using the design presented in FIG. 9.

The first stage of 4-point FFT implements 2-point FFT of $[x_1\ x_3]$ and $[x_2\ x_4]$ then generates $[a_1\ a_3]$ and $[a_2\ a_4]$ as output data. From (7) $[a_1\ a_3]$ and $[a_2\ a_4]$ are given by $$\begin{bmatrix} a_1 \\ a_3 \end{bmatrix} = 2^{0.5} \begin{bmatrix} x_1 + x_3 \\ x_1 - x_3 \end{bmatrix} \quad (8)$$

$$\begin{bmatrix} a_2 \\ a_4 \end{bmatrix} = 2^{0.5} \begin{bmatrix} x_2 + x_4 \\ x_2 - x_4 \end{bmatrix},$$

respectively. The second stage implements two 2-point FFT operations on $[a_1\ a_2]$ and $[a_3\ a_4 e^{-i\pi/2}]$, respectively. Using (7) or (8), output data will therefore be given by $$\begin{bmatrix} X_1 \\ X_3 \end{bmatrix} = 2 \begin{bmatrix} x_1 + x_3 + x_2 + x_4 \\ x_1 + x_3 - x_2 - x_4 \end{bmatrix} \quad (9)$$

$$\begin{bmatrix} X_2 \\ X_4 \end{bmatrix} = 2 \begin{bmatrix} x_1 - x_3 + x_2 - x_4 \\ x_2 - x_4 - (x_2 - x_4) e^{-i\pi/2} \end{bmatrix}.$$

From (1) it can be said that (9) represents scaled FFT of $[x_1\ x_2\ x_3\ x_4]$. Thus, the proposed method enables the implementation of a 4-point FFT using purely CORDIC based processors. The 4-point FFT can also be used to implement a scaled 4-point IFFT. As an example, if one is interested in evaluating the IFFT of $[x_1\ x_2\ x_3\ x_4]$, then the scaled IFFT results $F[x_1\ x_2\ x_3\ x_4]$ will be given by $$F[x_1 x_2 x_3 x_4] = [X_1 X_4 X_3 X_2] \quad (10)$$

where $X_1, X_2, X_3$ and $X_4$ are the scaled FFT results that have been given in (8).

<A 8-Point FFT>

Figure 13:
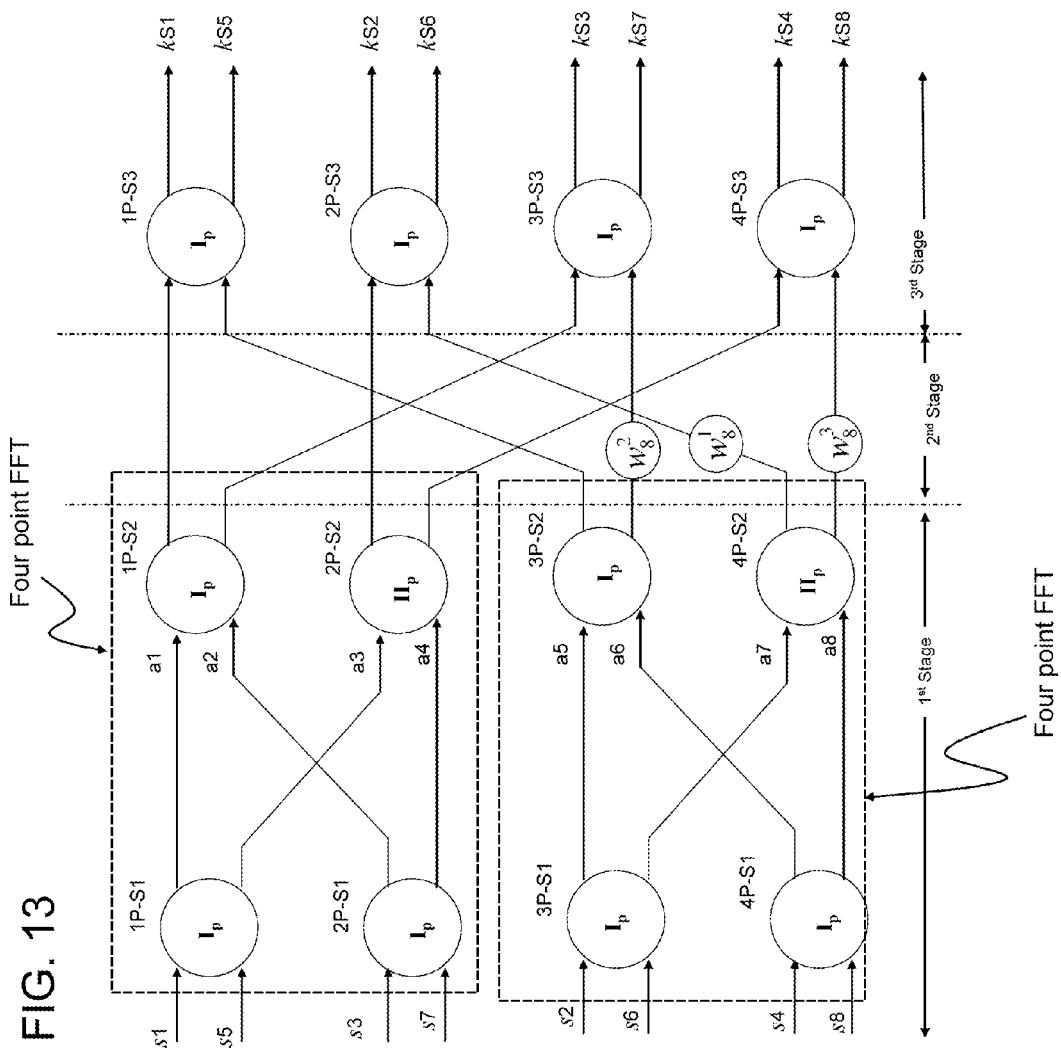
FIG. 13 is a diagram illustrating the configuration of an example according to the present invention, for implementing an 8-point FFT, using Ip and IIp that has been described in FIGS. 6 and 9, respectively.

FIG. 13 shows another example of FFT where the present invention can be applied. With reference to FIG. 13, a system for evaluating an 8-point FFT of eight samples of data $[s_1\ s_2 \ldots s_8]$ is implemented using three stages of processing.

First and second stage can be considered as performing two 4-point FFT operations. These are the FFT of $[s_1\ s_5\ s_3\ s_7]$ and $[s_2\ s_6\ s_4\ s_8]$, respectively. These two 4-point FFT are implemented as explained with reference to FIG. 12.

The output of the two 4-point FFT are then multiplied by two twiddle factors $w_8^1$, $w_8^2$ and $w_8^3$, where $$w_8^1 = e^{i2\pi/8}, \quad (11)$$

$$w_8^2 = e^{i2\pi 2/8} \quad (12)$$

and $$w_8^3 = e^{i2\pi 3/8} \quad (13)$$

respectively.

Third Stage of implementing an 8-point FFT involves four pairs of CORDIC for performing 2-point FFT operations. Note that in this figure, it is possible to combine the twiddle factor multiplication with $w_8^2$ and the 2-point FFT (3P-S3). When these two operations are combined, the pair of CORDIC processors (3P-S3) will be implemented using IIp that has been illustrated in FIG. 9.

<8-Point IFFT>

Figure 14:
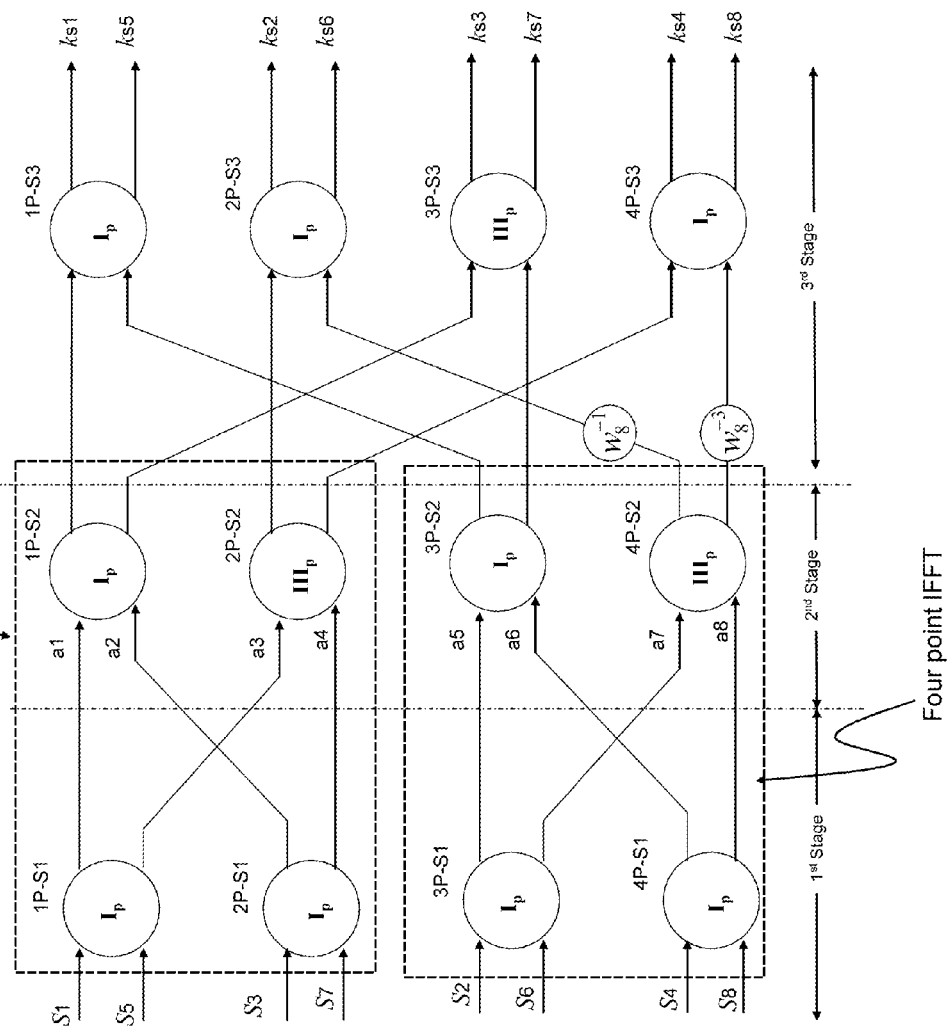
FIG. 14 is a diagram illustrating the configuration of an example according to the present invention for implementing an 8-point IFFT, using Ip and IIIp that has been described in FIGS. 6 and 11, respectively.

FIG. 14 shows the configuration of an IFFT where the present invention can also be applied. The general structure of implementation is similar to an 8-point FFT explained above. In this figure, an 8-point IFFT of eight samples of data [$S_1$ $S_2$ ... $S_8$] is implemented using three stages of processing. First and second stage can be considered as performing two 4-point IFFT operations. These are the IFFT of [$S_1$ $S_5$ $S_3$ $S_7$] and [$S_2$ $S_6$ $S_4$ $S_8$], respectively. The output of the two 4-point IFFT are multiplied by two twiddle factors $w_8^{-1}$ and $w_8^{-3}$, where $$w_8^{-1} = e^{-i2\pi/8} \tag{14}$$

and $$w_8^{-3} = e^{-i2\pi 3/8}, \tag{15}$$

respectively.

<4-Point IFFT>

As in the case of FFT, a 4-point IFFT consist of two stages. In the first stage, there are two pairs of CORDIC processors. The first pair computes 2-point IFFT of data samples [$S_1$ $S_5$] while the second pair of CORDIC processors computes 2-point IFFT of [$S_3$ $S_7$]. The computation of 2-point IFFT is based on design proposed in FIG. 6 or FIG. 8. The outputs from these two pairs of CORDIC processors are [$a_1$ $a_3$] and [$a_2$ $a_4$], respectively. The output data from the first stage, are then processed in the second stage as follows:

Evaluate 2-point IFFT of two samples of data, [$a_1$ $a_2$], using the first pair of CORDIC processors in second stage of a 4-point FFT. Once again, the 2-point IFFT can be implemented using the design proposed in FIG. 6 or FIG. 8. Next, evaluate 2-point IFFT of two samples of data [$a_3$ $a_4 e^{-\pi/2}$] using the second pair of CCORDIC processors in the second stage of a 4-point IFFT. This operation is implemented using the design presented in FIG. 11.

Third Stage of implementing an 8-point IFFT involves three pairs of CORDIC for performing 2-point IFFT operations and one pair of CORDIC for evaluating 2-point IFFT of [$b_5$ $b_6 e^{-i\pi/2}$]. The later one-pair of CORDIC is implemented as shown in FIG. 11.

INDUSTRIAL APPLICABILITY

It is possible to apply this technology to any signal processing system that evaluates FFT or IFFT using a stage with 2-point FFT or IFFT.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An apparatus for performing a 2-point FFT, wherein first and second complex input signals are evaluated to generate 2-point FFT's first and second complex output signals, said apparatus comprising first and second CORDIC processors, each of the first and second CORDIC processors including:
   first and second input ports that respectively represent a real input port and an imaginary input port; and
   first and second output ports that respectively represent a real output port and an imaginary output port for outputting rotated data;
   wherein a real part of the first input signal is applied to the imaginary input port of the first CORDIC processor;
   an imaginary part of the first input signal is applied to the imaginary input port of the second CORDIC processor;
   a real part of the second input signal is applied to the real input port of the first CORDIC processor;
   an imaginary part of the second input signal is applied to the real input port of the second CORDIC processor; and
   the first and second CORDIC processors rotate the respective input signals applied thereto by 45 degrees in the clockwise direction;
   wherein data from the real output port of said first CORDIC processor, and data from the real output port of the second CORDIC processor constitute respectively a real part and an imaginary part of the 2-point FFT's first output signal; and
   data from the imaginary output port of said first CORDIC processor, and data from the imaginary output port of said second CORDIC processor constitute respectively a real part and an imaginary part of the 2-point FFT's second output signal.

2. An apparatus for performing a 2-point FFT, wherein first and second complex input signals are evaluated to generate 2-point FFT's first and second complex output signals, said apparatus comprising first and second CORDIC processors, each of said first and second CORDIC processors including:
   first and second input ports that respectively represent a real input port and an imaginary input port; and
   first and second output ports that respectively represent a real output port and an imaginary output port for outputting rotated data; wherein a real part of the first input signal is applied to the real input port of the first CORDIC processor,
   an imaginary part of the first input signal is applied to the real input port of the second CORDIC processor;
   a real part of the second input signal is applied to the imaginary input port of the first CORDIC processor,
   an imaginary part of the second input signal is applied to the imaginary input port of the second CORDIC processor; and
   the first and second CORDIC processors rotate respective input signals applied thereto by 45 degrees in the anti-clockwise direction;
   wherein data from the imaginary output port of the second CORDIC processor, and data from the imaginary output port of the first CORDIC processor, constitute respectively a real part and an imaginary part of the 2-point FFT's first output signal; and
   data from the real output port of the second CORDIC processors, and data from the real output port of the first CORDIC processors, constitute respectively a real part and an imaginary part of the 2-point FFT's second output signal.

3. An apparatus for performing a 4-point FFT, comprising first and second stages that process FFT of four complex data samples;
   wherein the first stage includes two 2-point FFT units that process four complex input signals, each of said two 2-point FFT units processing data as defined in claim 1; and the second stage processes the output of the first stage using two 2-point FFT.

4. An apparatus for performing a 4-point FFT, comprising first and second stages that process FFT of four complex data samples;
wherein the first stage includes two 2-point FFT units that process four complex input signals; and
the second stage processes the output of the first stage using first and second pair of CORDIC processors, each CORDIC processor including:
first and second input ports that respectively represent a real input port and an imaginary input port; and
first and second output ports that respectively a represent real output port and an imaginary output port for outputting rotated data;
wherein in the second stage of the FFT,
first and second input signals into a first pair of CORDIC processors are processed as defined in claim 1; and
the second pair of CORDIC processors process third and fourth input signals applied thereto as follows:
applying a real part of the third input signal to the real input port of a first CORDIC processor of the second pair of CORDIC processors;
applying an imaginary part of the third input signal to the real input port of a second CORDIC processor of the second pair of CORDIC processors;
applying a real part of the fourth input signal to the imaginary input port of the second CORDIC processor of the second pair of CORDIC processors;
applying an imaginary part of the fourth input signal to the imaginary input port of the first CORDIC processor of the second pair of CORDIC processors; and
the first and second CORDIC processors of the second pair of CORDIC processors, rotating respective input signals applied thereto by 45 degrees in the anticlockwise direction;
wherein data from the imaginary output port of the first CORDIC processor, and data from the real output port of the second CORDIC processor in the second pair of CORDIC processors, constitute respectively a real part and an imaginary part of a third output signal from the second stage of the FFT; and
the data from real output port of first CORDIC processor, and data from the imaginary output port of the second CORDIC processor in the second pair of CORDIC processors, constitute respectively a real part and an imaginary part of a fourth output signal from the second stage of the FFT.

5. An apparatus for performing an 8-point FFT, comprising three stages for processing FFT of eight complex data samples;
wherein the first stage includes two pairs of 4-point FFT that process eight complex input signals to generate eight complex output signals;
in the second stage, the output signals of the two pairs of said 4-point FFT are multiplied by twiddle factors to generate an output for being processed by the third stage of the 8-point FFT; and
the third stage comprises four pairs of 2-point FFT units, each of which processes data as defined in claim 1.

6. An apparatus for performing an FFT, comprising a plurality of stages that process FFT of complex data samples, with at least one stage implemented using at least one 2-point FFT unit;
wherein in the stage implementing 2-point FFT, at least one 2-point FFT unit processes data as defined in claim 1.

7. An apparatus for performing an FFT, comprising a plurality of stages for processing FFT of complex data samples with at least one stage implemented using at least one 4-point FFT unit;
wherein in the stage implementing 4-point FFT, at least one 4-point FFT unit processes data as defined in claim 3.

8. An apparatus for performing an FFT, comprising a plurality of stages for processing FFT of complex data samples with at least one stage implemented using at least 8-point FFT unit;
wherein in the stage implementing 8-point FFT, at least one 8-point FFT unit processes data as defined in claim 5.

9. An apparatus for processing first, second, third and fourth complex input signals, comprising first and second pairs of CORDIC processors that rotate the fourth input signal applied thereto in the clockwise direction by 90 degrees and evaluate a 2-point FFT of the third input signal and the rotated fourth input signal;
each CORDIC processor of the first and second pairs of CORDIC processors including:
first and second input ports that respectively a represent real an input port and imaginary input port; and
first and second output ports that respectively represent a real output port and an imaginary output port for outputting rotated data;
where in the processor,
first and second input signals into the first pair of CORDIC processors are processed as defined in claim 1; and
third and fourth input signals into the second pair of CORDIC processors are processed as follows:
applying a real part of the third input signal to the real input port of the first CORDIC processor of the second pair of CORDIC processors;
applying an imaginary part of the third input signal to the real input port of the second CORDIC processor of the second pair of CORDIC processors;
applying a real part of the fourth input signal to the imaginary input port of the second CORDIC processor of the second pair of CORDIC processors;
applying an imaginary part of the fourth input signal to the imaginary input port of the second CORDIC processor of the second pair of CORDIC processors; and
the first and second CORDIC processors of the second pair of CORDIC processors, rotating respective input signals applied thereto by 45 degrees in the anticlockwise direction;
wherein data from the imaginary output port of the first CORDIC processor, and data from the real output port of the second CORDIC processor in the second pair of CORDIC processors, constitute respectively a real part and an imaginary part of a first output signal; and
data from the real output port of the first CORDIC processor, and data from the imaginary output port of the second CORDIC processor in the second pair of CORDIC processors, constitute respectively a real part and an imaginary part of a second output signal.

10. An apparatus for performing a 2-point IFFT, comprising two CORDIC processors,
each CORDIC processor including:
first and second input ports that respectively represent a real input port and an imaginary input port; and
first and second output ports that respectively represent a real output port and an imaginary output port for outputting rotated data;
wherein IFFT of two samples of complex input signals is evaluated to generate 2-point IFFT's first and second output signals as follows:

applying a real part of the first input signal to the imaginary input port of the first CORDIC processor;

applying an imaginary part of the first input signal to the imaginary input port of the second CORDIC processor;

applying a real part of second input signal to the real input port of the first CORDIC processor, applying an imaginary part of second input signal to the real input port of the second CORDIC processor; and the first and second CORDIC processors rotating respective input signals applied thereto by 45 degrees in the clockwise direction; wherein data from the real output port of first CORDIC processor, and data from the real output port of the second CORDIC processor, constitute respectively a real part and an imaginary part of the 2-point IFFT's first output signal; and data from the imaginary output port of first CORDIC processor, and the imaginary output port of the second CORDIC processor, constitute respectively a real part and an imaginary part of the 2-point IFFT's second output signal.

11. An apparatus for performing a 4-point IFFT, comprising two stages that process IFFT of four complex data samples, wherein the first stage includes two 2-point IFFT units that process four complex input signals; and the second stage processes the output of the first stage using two 2-point IFFT, wherein in the first stage, the 4-point IFFT unit process data as defined in claim 10.

12. An apparatus for performing a 4-point IFFT, comprising two stages that process IFFT of four complex data samples, wherein the first stage includes two 2-point IFFT units that process complex input signals; and the second stage processes the output of the first stage using two pairs of CORDIC processors, each CORDIC processor including:

first and second input ports that respectively represent a real input port and an imaginary input port; and first and second output ports that respectively represent a real output port and an imaginary output port for outputting rotated data;

wherein in the second stage of the IFFT, first and second input signals into the first pair of CORDIC processors are processed as defined in claim 10; and third and fourth input signals into the second pair of CORDIC processors is processed as follows:

applying a real part of the third input signal to the real input port of the first CORDIC processor of the second pair of CORDIC processors;

applying an imaginary part of the third input signal to the real input port of the second CORDIC processor of the second pair of CORDIC processors;

applying a real part of the fourth input signal to the imaginary input port of the second CORDIC processor of the second pair of CORDIC processors;

applying an imaginary part of the fourth input signal to the imaginary input port of the first CORDIC processor of the second pair of CORDIC processors; and the first and second CORDIC processors of the second pair of CORDIC processors, rotating respective input signals applied thereto by 45 degrees in the anticlockwise direction;

wherein data from the real output port of first CORDIC processor, and data from the imaginary output port of the second CORDIC processor in the second pair of CORDIC processors, constitute respectively a real part and an imaginary part of the third output signal from the second stage of the IFFT; and data from the imaginary output port of first CORDIC processor, and data from the real output port of the second CORDIC processor in the second pair of CORDIC processors, constitute respectively a real part and an imaginary part of the fourth output signal from the second stage of the IFFT.

13. An apparatus for performing an 8-point IFFT, comprising three stages that process IFFT of eight complex data samples;

wherein the first stage includes two pairs of 4-point IFFT units that process eight complex input signals to generate eight complex output signals;

in the second stage, the outputs of said two pairs of 4-point IFFT are multiplied by twiddle factors to generate an output for being processed by the third stage of the 8-point IFFT; and the third stage comprises four pairs of 2-point IFFT units, at least one of which processes data as defined in claim 10.

14. An apparatus for performing an IFFT, comprising multiple stages that process IFFT of complex data samples with at least one stage implemented using at least one 2-point IFFT unit, wherein in the stage implementing 2-point IFFT, at least one 2-point IFFT unit processes data as defined in claim 10.

15. An apparatus for performing an IFFT, comprising a plurality of stages that process IFFT of complex data samples with at least one stage implemented using 4-point IFFT unit;

wherein in the stage implementing 4-point IFFT, at least one 4-point IFFT processes data as defined in claim 11.

16. An apparatus for performing an IFFT comprising multiple stages that process IFFT of complex data samples with at least one stage implemented using at least 8-point IFFT units;

wherein in the stage implementing 8-point IFFT, at least one 8-point IFFT processes data as defined in claim 13.

17. An apparatus for processing four samples of complex input signals, the processor comprising first and second pairs of CORDIC processors for rotating the fourth signal in the clockwise direction by 90 degrees and evaluating a 2-point IFFT of the third input signal and the rotated fourth input signal;

each CORDIC processor including:

first and second input ports that respectively represent a real input port and an imaginary input port; and first and second output ports that respectively represent a real output port and an imaginary output port for outputting rotated data;

wherein in the processor, first and second input signals into the first pair of CORDIC processors are processed as defined in claim 10; and third and fourth input signals into the second pair of CORDIC processors are processed as follows:

applying a real part of the first input signal to the real input port of the first CORDIC processor of the second pair of CORDIC processors;

applying an imaginary part of the first input signal to the real input port of the second CORDIC processor of the second pair of CORDIC processors;

applying a real part of the second input signal to the imaginary input port of the second CORDIC processor of the second pair of CORDIC processors;

applying an imaginary part of the second input signal ('a4') to the imaginary input port of the second CORDIC processor of the second pair of CORDIC processors; and the first and second CORDIC processors of the second pair of CORDIC processors, rotating respective input signals applied thereto by 45 degrees in the anticlockwise direction;

wherein data from the real output port of first CORDIC processor, and data from the imaginary output port of the second CORDIC processor in the second pair of real number CORDIC processors, constitute respectively a real part and an imaginary part of a first output signal; and data from the imaginary output port of first CORDIC processor, and data from the real output port of the second CORDIC processor in the second pair of CORDIC processors, constitute respectively a real part and an imaginary part of a second output signal.

18. An apparatus for performing an IFFT comprising a plurality of stages that process IFFT of complex data samples, with at least one stage processing two complex input data using first and second CORDIC processors as defined in claim 11.

19. An apparatus for performing a 4-point FFT, comprising first and second stages that process FFT of four complex data samples;
  wherein the first stage includes two 2-point FFT units that process four complex input signals, each of said two 2-point FFT units processing data as defined in claim 2; and
  the second stage processes the output of the first stage using two 2-point FFT.

20. An apparatus for performing an 8-point FFT, comprising three stages for processing FFT of eight complex data samples;
  wherein the first stage includes two pairs of 4-point FFT that process eight complex input signals to generate eight complex output signals;
  in the second stage, the output signals of the two pairs of said 4-point FFT are multiplied by twiddle factors to generate an output for being processed by the third stage of the 8-point FFT; and
  the third stage comprises four pairs of 2-point FFT units, each of which processes data as defined in claim 2.

* * * * *